United States Patent
Shumeiko et al.

(10) Patent No.: US 12,012,234 B2
(45) Date of Patent: Jun. 18, 2024

(54) ELECTRODELESS PLASMA THRUSTER WITH CLOSED-RING-SHAPED GAS DISCHARGE CHAMBER

(71) Applicant: Khalifa University of Science and Technology, Abu Dhabi (AE)

(72) Inventors: Andrei Ivanovich Shumeiko, Abu Dhabi (AE); Firas Salah Jarrar, Abu Dhabi (AE); Sean Shan Min Swei, Abu Dhabi (AE)

(73) Assignee: Khalifa University of Science and Technology, Abu Dhabi (AE)

(*) Notice: Subject to any disclaimer, the term of this patent is extended or adjusted under 35 U.S.C. 154(b) by 0 days.

(21) Appl. No.: 17/998,483

(22) PCT Filed: Sep. 7, 2021

(86) PCT No.: PCT/IB2021/058145
§ 371 (c)(1),
(2) Date: Nov. 10, 2022

(87) PCT Pub. No.: WO2023/037138
PCT Pub. Date: Mar. 16, 2023

(65) Prior Publication Data
US 2023/0271728 A1    Aug. 31, 2023

(51) Int. Cl.
*B64G 1/40* (2006.01)
*F03H 1/00* (2006.01)

(52) U.S. Cl.
CPC .......... *B64G 1/405* (2013.01); *F03H 1/0006* (2013.01)

(58) Field of Classification Search
CPC ..................................................... B64G 1/405
See application file for complete search history.

(56) References Cited

U.S. PATENT DOCUMENTS 7,436,122 B1 * 10/2008 Beal ...................... F03H 1/0075
315/111.21
2007/0114903 A1    5/2007 Tolmachev et al.
(Continued)

FOREIGN PATENT DOCUMENTS

WO    2019229286    12/2019
WO    2021081427    4/2021

OTHER PUBLICATIONS

Exoterra "Courier 12U SEP Satellite Bus" (Year: 2020).*
(Continued)

*Primary Examiner* — Arun Goyal
*Assistant Examiner* — William L Breazeal
(74) *Attorney, Agent, or Firm* — Kilpatrick Townsend & Stockton LLP

(57) ABSTRACT

An electrodeless plasma thruster with closed-ring-shaped gas discharge chamber (1, 10) can include a gas discharge chamber (1, 10) closed-ring-shaped in fluid communication with a propellant storage system (10, 70). An antenna (3, 30) can be positioned on the exterior of the gas discharge tube (1, 10). A guide tube (2, 20) can be coupled with the gas discharge chamber (1, 10) at a first end and have a second open end. A magnetic system (7, 50) can be positioned on the second end of the guide tube (2, 20). The magnetic system (7, 50) can be electrically coupled with a power supply. The power supply can be electrically coupled with a power converter (11, 80) and a control module.

16 Claims, 3 Drawing Sheets

(56) References Cited

U.S. PATENT DOCUMENTS

| | | | | |
|---|---|---|---|---|
| 2013/0327015 A1* | 12/2013 | Pollet | ............... | B64G 1/401 |
| | | | | 60/202 |
| 2016/0207642 A1 | 7/2016 | Longmier et al. | | |
| 2018/0244407 A1* | 8/2018 | Rozman | ............... | H02J 9/00 |
| 2023/0150698 A1* | 5/2023 | King | ............... | B64G 1/402 |
| | | | | 244/172.2 |

OTHER PUBLICATIONS

Bouwmeester "Command and Data Handling" (Year: 2017).*
PCT/IB2021/058145, "International Search Report and Written Opinion", May 17, 2022, 10 pages.
Takahashi, K. (2012). Radiofrequency antenna for suppression of parasitic discharges in a helicon plasma thruster experiment. Review of Scientific Instruments, 83(8), 083508 (doi.org/10.1063/1.4748271).
Shumeiko, A., & Telekh, V. (2019). Probe diagnostics of the plasma plume created by a magnetic nozzle of an inductively coupled plasma source. In Journal of Physics: Conference Series (vol. 1393, No. 1, p. 012027). IOP Publishing. (doi.org/10.1088/1742-6596/1393/1/012027).

* cited by examiner

ELECTRODELESS PLASMA THRUSTER WITH CLOSED-RING-SHAPED GAS DISCHARGE CHAMBER

BACKGROUND

Propulsion systems, for example, propulsion systems used for space missions can include chemically, electrically—electrostatic, electromagnetic, and wave,—magnetically (tethers), and solar beam powered thrusters. These thrusters generally have one direction of generated thrust vector. However, more than one direction of thrust is generally needed. For example, satellites can use multiple propulsion systems to make orbit corrections and for attitude control, for example, as in the case of satellites for Geostationary orbits. Incorporating multiple propulsion systems into satellites can increase the weight of the satellite—that leads to the decrease of payload,—and the costs associated with launching the satellites into orbit. Additionally, satellites have a minimum size requirement to be able to successfully incorporate multiple propulsion systems.

REFERENCES

[1] Takahashi, K. (2012). Radiofrequency antenna for suppression of parasitic discharges in a helicon plasma thruster experiment. Review of Scientific Instruments, 83(8), 083508 (doi.org/10.1063/1.4748271).
[2] Chabert, P., & Braithwaite, N. (2011). Physics of radiofrequency plasmas. Cambridge University Press.
[3] Shumeiko, A., & Telekh, V. (2019). Probe diagnostics of the plasma plume created by a magnetic nozzle of an inductively coupled plasma source. In Journal of Physics: Conference Series (Vol. 1393, No. 1, p. 012027). IOP Publishing. (doi.org/10.1088/1742-6596/1393/1/012027)

BRIEF DESCRIPTION OF THE DRAWINGS

Various embodiments in accordance with the present disclosure will be described with reference to the drawings, in which.

DETAILED DESCRIPTION

Figure 1:
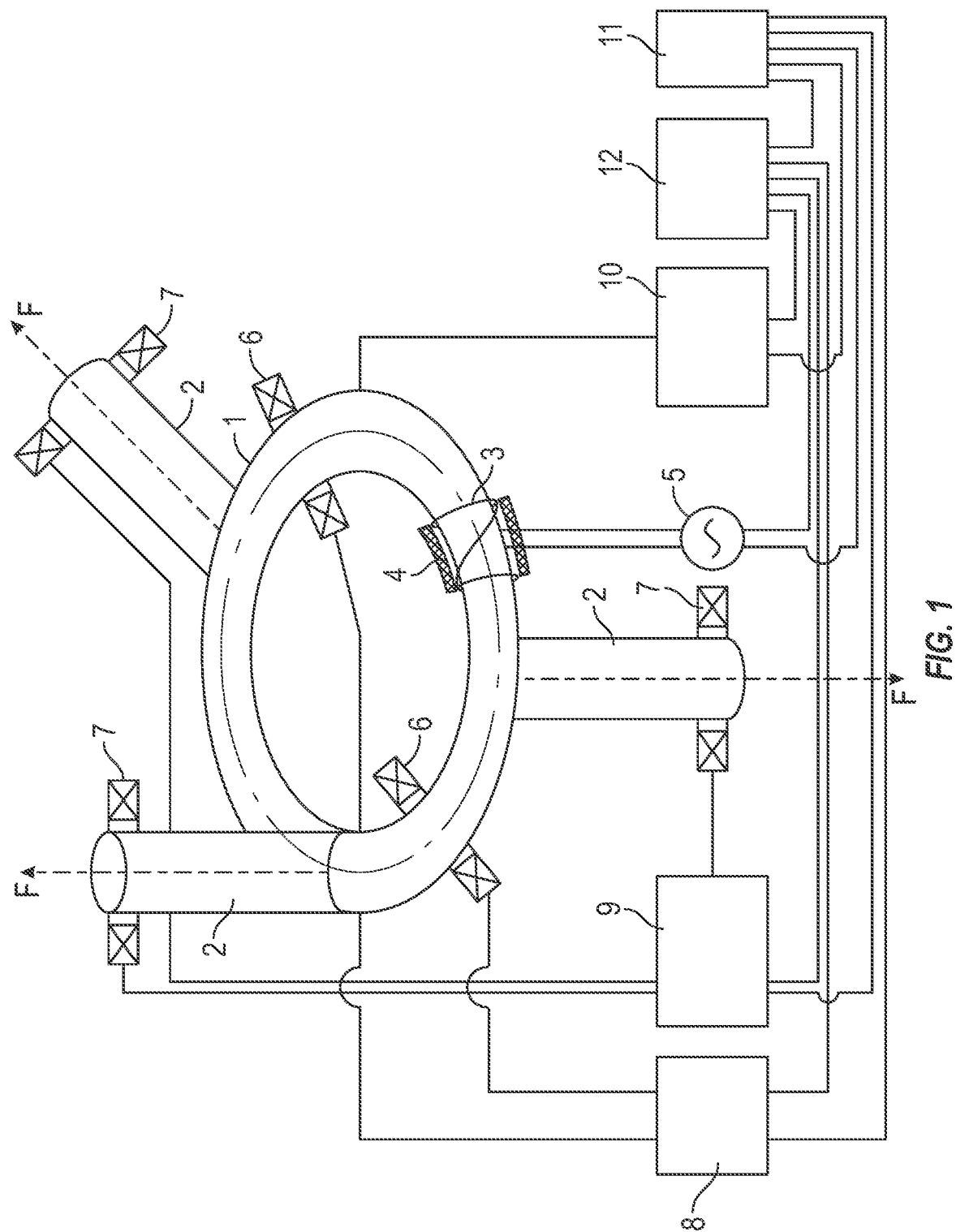
FIG. 1 illustrates a wave plasma thruster with a closed-ring-shaped gas discharge chamber, according to various embodiments.

Low earth orbit (LEO) spacecraft (SC) can have a variety of technical problems associated with the design and operation of the SC. For example, a SC may have limited maneuverability because they usually use a single thrust vector propulsion system for all flight operations, such as transferring from parking orbit to a target orbit, maneuvering between orbits, altitude control, supporting the orbit, attitude control, and/or deorbiting. Additionally, with a large amount of SC in LEO, the limited maneuverability can increase the risk of collisions between SC, and as a result the increase of LEO debris preventing future space missions to be launched to space from the Earth.

Further technical problems include, but are not limited to: 1. compensation of the aerodynamic drag forces affecting the SC due to the presence of residual atmospheric gases in LEO; 2. limited lifetime of conventional (Hall and Ion type) electric propulsion systems (EP), associated with the destruction of the cathode-neutralizer, necessary for the operation of conventional EP systems, and their structural elements—anode of Hall type and ion-optical system grids of Ion type—in the upper atmosphere; 3. high energy consumption of existing EP systems. Due to the high cost of ion in existing EP—Hall and Ion type, Laser ablation, magneto-plasma drive (MPD), field emission electric propulsion (FEEP)—plasma sources and the cost of thrust, existing EP require high specific—per mass or volume or thrust—power to operate; 4. large mass and volume of existing EP systems due to the stock of a large amount of propellant to be utilized by EP for maintenance of the SC in LEO, since some conventional EP systems have insufficient specific impulse for their effective operation in LEO; 5. unloading of SC attitude control systems. At the moment, complex systems are used for unloading, including mechanical, electromagnetic, and gravitational systems that take up the mass, volume, and power of the SC, which could be allocated for the payload; 6. the use of upper stages for the transfer of a SC from the parking orbit to the target orbit, which reduces the mass of the payload that can be taken out by the launch vehicle, and there are cases of the unsuccessful launch of the SC to the target orbit due to upper stages failure; 7. deorbiting of the spacecraft from the target orbit at the end of the active life of the SC to reduce contamination of the Earth's orbits with artificial objects; and/or 8. the inability to effectively use outboard air as a propellant for the conventional EP, that means inability to create effective Air-Breathing Propulsion Systems with conventional EP.

Considering modern tendency toward miniaturization of satellites and explosive growth in the number of satellites in LEO, there is a strong demand for propulsion systems that are capable to operate onboard small satellites. But there are limited number of thrusters for small satellites, and these thruster does not meet the future demands for the propulsion systems for small satellites in near 50 years such as that propulsion system has to perform all thrust required operations, satellites have to be fully electric and has a relatively long service life.

Plasma thrusters are known. For example, U.S. Pat. No. 6,293,090, published on 25 Sep. 2001 discusses a plasma thruster including an RF generator, a set of radiating elements, a gas discharge chamber defining the main axis of the thruster, a magnetic system, a power source of the magnetic system, a propellant supply system connected to a gas discharge chamber. However, the known plasma thruster has several disadvantages. These disadvantages include that the gas feedthrough is connected to the gas discharge chamber from one of its ends. In this case, the ability to use two ends of the gas-discharge chamber for the flow of plasma and the creation of thrust in this direction is lost. Thus, the volume, mass and power consumption of the propulsion system increases when several such engines are placed to control several thrust axes, which makes it inefficient or impossible to use them on board the spacecraft. The use of multiple radiating elements that are fed from a single RF generator for generating a plasma discharge in one gas discharge chamber will lead to instabilities in the generated plasma, which are associated with difference in electromagnetic radiation generated by the different radiating elements along the length of the gas discharge chamber, which in turn will reduce the thrust and specific impulse of the thruster.

The use of multiple closely spaced radiating elements operating at RF frequencies will lead to the appearance of spurious capacitive coupling discharges between the radiating elements, and between the radiating elements and the magnetic system of the thruster due to the occurrence of capacitive coupling between these elements, which will eventually reduce the efficiency of the thruster, in particular, will reduce the specific thrust and specific impulse per unit of input RF power, will decrease thruster service life due to the destruction of elements of the thruster by capacitive coupling discharge sputtering. Moreover, the sputtering of the elements near the gas discharge tube affected by the capacitive coupling discharge sputtering will lead to the impossibility of the power transfer to the plasma and the resulting thruster failure due the deposition of the sputtered material on the external surface of the gas discharge chamber that will shield from the plasma the electromagnetic radiation generated by the radiating elements. The placement of the gas feedthrough at upstream side of the gas discharge chamber will lead to the loss of power to the process of re-ionization of recombined particles of the ionized propellant along the length of the discharge chamber, which in turn leads to reduction of specific thrust and specific impulse of the thruster per unit of power.

Another known plasma thruster, as described in CN104405603B, published 12 Apr. 2017, can include at least one metal ring that makes up the thruster housing, the first and second metal flanges, a helicon antenna, a gas discharge chamber, a gas feedthrough, and at least two rings of magnets. However, there are disadvantages to this plasma thruster. These disadvantages include that the gas feedthrough is connected to the gas discharge chamber from one of its ends. In this case, the ability to use two ends of the gas-discharge chamber for the flow of plasma and the creation of thrust in this direction is lost. Thus, the volume, mass and power consumption of the propulsion system increases when several such engines are placed to control several thrust axes, which makes it inefficient or impossible to use them on board the spacecraft. The placement of the gas feedthrough at upstream side of the gas discharge chamber will lead to the loss of power to the process of re-ionization of recombined particles of the ionized propellant along the length of the discharge chamber, which in turn leads to reduction of specific thrust and specific impulse of the thruster per unit of power.

The use of the Helicon antenna without protective dielectric rings will result in spurious capacitively coupled discharges on the surface as the antenna itself and on the surfaces of other elements proposed in the invention which will eventually reduce the efficiency of the thruster, in particular, will reduce the specific thrust and specific impulse per unit of input RF power, will decrease thruster service life due to the destruction of elements of the thruster by capacitive coupling discharge sputtering. Moreover, the sputtering of the elements near the gas discharge tube affected by the capacitive coupling discharge sputtering will lead to the impossibility of the power transfer to the plasma and the resulting thruster failure due the deposition of the sputtered material on the external surface of the gas discharge chamber that will shield from the plasma the electromagnetic radiation generated by the radiating elements.

[0013] A low-thrust rocket engine, as described in patent RU2445510C2, published on 20 Mar. 2012, is also known. The low-thrust rocket engine can include a gas discharge chamber (main chamber) that determines the axis of the thrust forces, a propellant injector, an antenna, magnetic field generators, an electromagnetic field generator, a generator for changing the direction of the magnetic field.

However, the low-thrust rocket includes only a single direction of the thrust of the gas discharge chamber. The injector of the propellant closes one of the ends of the gas discharge chamber, which in turn leads to the inefficiency of its use, since when using the proposed method of gas ionization—the electromagnetic method, plasma can flow out of the two ends of the gas-discharge chamber. When developing the thruster for a spacecraft (SC), in particular, the thruster with more than one thrust vector, proposed in FIG. 40 and described in p. 60 of claims, the use of only one end of the discharge chamber will increase the weight and dimensions of the engine, which can lead to the inability to use proposed thruster onboard spacecraft due to the high weight and size characteristics. The proposed antenna, in particular the use of capacitively coupled electrodes as the antenna, is impractical for use onboard the spacecraft. This is due to the fact that a parasitic capacitive discharge will begin to occur on all elements of the propulsion system and spacecraft, which are close to the capacitively coupled electrodes, while the capacitive discharge will destroy both the electrodes themselves and the structural elements of the thruster and spacecraft.

The problem of the occurrence and consequences of parasitic capacitive discharge is described in reference 1. Also, the use of a capacitive discharge for ionization of the propellant is an inefficient method of generating plasma for space engines, since the plasma of a capacitive discharge has a low density (no more than $10^{16}$ m$^{-3}$) at low pressure and low power, which will not be enough for the efficient operation of the thruster. Data on the plasma density of a capacitive discharge are presented in reference 2.

The proposed antenna, in particular the use of an inductively coupled coil in it, is impractical for use on board the spacecraft. This is due to the fact that in this case, the energy from the inductor to the plasma will be transmitted as in a transformer, while the transformation coefficient will not be more than 0.5. Taking into account the power losses on the RF-generator-inductor line and the losses in the antenna, the generation of dense plasma (above $10^{18}$ m$^{-3}$) will require high power (above 800 W), making it impossible to use the thruster with such a plasma source on small spacecraft that have a low power capabilities.

The proposed antenna, in particular the use of Double-Saddle and Loop antennas, is also impractical for use on board small spacecraft. This is due to the fact that, as in the case with the use of capacitively coupled electrodes, at low power, parasitic capacitive discharges will occur on the surface of the antenna itself and on the structural elements of the thruster and spacecraft. Due to the sputtering of the metal antenna and the metal elements of the thruster, the external surface of the gas discharge tube will be covered with a metal film, which will shield electromagnetic waves generated by an antenna, and the ionization process of the propellant inside the discharge chamber will be impossible, i.e. this case will lead to the thruster failure. The proposed location of the gas feedthrough at the upstream side of the gas discharge chamber is inefficient in terms of power transfer in the plasma. In the case the ionization of the propellant takes place at the beginning of the gas discharge chamber and the antenna capable for the wave propagation regime in plasma is used (Double-Saddle and Loop antenna), the more power to ionization will be required since the formation of waves in plasma occurs downstream side from the antenna.

The use of a large number of magnetic systems is impractical, because for the plasma acceleration, a single magnetic nozzle at the outlet of the gas-discharge chamber is sufficient. A large number of magnetic systems leads to the increase of the mass and volume of the thruster. The invention does not have an electromagnetic shielding system. A device that uses electromagnetic waves and a magnetic field to generate and accelerate plasma creates electromagnetic radiation, which, when absorbed by the elements of the spacecraft and can cause a magnetic moment to start rotating the spacecraft, as well as cause failures in the operation of the payload of the spacecraft or destruct it.

Embodiments and techniques described herein are directed to electric propulsion systems which can be used, for example, with SC to address one of more of the technical problems or disadvantages of current propulsion systems, discussed herein. In various embodiments, the electric propulsion systems can include the electrodeless plasma thrusters with closed ring-shaped gas discharge chamber. The electrodeless plasma thrusters with closed ring-shaped gas discharge can include an electrodeless plasma source and an acceleration stage. The plasma thrusters can use a variety of propellants for operation, for example, to move the SC from a parking orbit to a target orbit, maintain current orbit, attitude control of the SC, altitude control of the SC, unloading attitude control systems, maneuvering the SC between orbits, and/or de-orbiting the SC.

Turning now to a particular example, in this example, an electric propulsion system can include a high frequency plasma thruster with closed ring-shaped gas discharge chamber. The high frequency plasma thruster with closed ring-shaped gas discharge chamber can include a closed ring-shaped gas discharge chamber, for example, a gas discharge chamber having the form of a closed ring tube. A first end of a guide tube can be coupled with the gas discharge chamber and a second end of the guide tube can be open to the outside space. An antenna, for example, a magnetic core antenna can be positioned on the outside of the gas discharge chamber. The antenna can include an electrical communication line with a high frequency generator (HF-generator). The HF-generator can have additional communication lines with a power converter and/or a control module. A magnetic system can be positioned at the second end of the guide tube and electrically connected with a power supply. The power supply can include a power converter and a control module. A propellant storage system can include a gas-dynamic connection with the gas discharge chamber. For example, the propellant storage system can be connected to the gas discharge chamber through the radial feedthrough. The propellant storage system can include electrical communication lines with the power converter and/or the control module. The power converter can include electrical communication lines with an on-board power source of the spacecraft, the HF-generator, the power supply, the propellant storage system, and/or the control module. The control module can include electrical communication line coupled with the power converter, the propellant storage system, the HF-generator, and the power supply. Turning to another particular embodiment, in this example, an electric propulsion system can include a wave plasma thruster with closed ring-shaped gas discharge tube. The wave plasma thruster with a closed-ring-shaped gas discharge chamber can include a gas-discharge chamber, for example, a closed ring tube gas-discharge chamber. A first end of a guide tube can be connected to the gas discharge chamber and a second end of the guide tube can be open to the outside space. An antenna can be located on the outside of the gas discharge chamber. The antenna can include an electrical communication line with a radiofrequency generator (RF-generator). A dielectric sleeve with metallized outer surface can cover the external surface of the antenna. The RF-generator can include electrical communication lines connected to the antenna, a power converter, and/or a control module. At least one trapping magnetic system can at least partially surround the gas discharge chamber. The trapping magnetic system can include an electrical communication line coupled with a first power supply. An accelerating magnetic system can be electrically coupled with a second power supply and located at the second end of the guide tube. The first power supply can include electrical communication lines coupled with the trapping magnetic system, the power converter, and/or the control module. The second power supply can include electrical communication lines coupled with the accelerating magnetic system, the power converter, and/or the control module. A propellant storage system can include a gas-dynamic connection with the gas discharge chamber and an electrical communication lines coupled with the power converter and the control module. The propellant storage system can be connected to the gas discharge chamber, for example, through the radial feedthrough. The power converter can include electrical communication lines with an on-board power source of the spacecraft, the RF-generator, the first and second power supplies, the propellant storage system, and/or the control module. The control module can include electrical communication line coupled with the power converter, the propellant storage system, the RF-generator, and the first and second power supplies.

The use of electrodeless plasma thrusters with closed ring-shaped gas discharge chamber in SC can allow for the reduction or elimination of: occurrences of parasitic discharges that destroy or reduce the structural integrity of structural elements of the thruster and SC; power losses on an electromagnetic antenna-plasma communication line; the influence of electromagnetic field on the structural elements of the propulsion system and the structural elements of the spacecraft, which can lead to the rotation of small spacecraft in space. Further, the use of electrodeless plasma thrusters with closed-ring-shaped gas discharge chamber in SC can lead to improvements in the SC compared with traditional propulsion systems. For example, the reduction of the mass and volume occupied by the propulsion system for performing boosting operations, altitude and attitude control, orbit maintenance, and/or deorbiting and an increase in the specific thrust and specific impulse of the propulsion system per unit of consumed power. As a result of using electrodeless plasma thrusters with closed ring-shaped gas discharge chamber it is possible to take more payload and/or decrease the cost of space mission Various embodiments discussed herein include electric propulsion with magnetic nozzles. The magnetic nozzles can be used for controlling plasma flow. EP using magnetic nozzles are classified as electromagnetic, and include magnetoplasmodynamic, helicon thrusters, wave plasma thrusters, and VASIMR thruster. These advanced EP are needed to meet the requirements of future space missions and are designed to produce a large specific impulse and thrust greater than that of existing EP at the same power level.

Magnetic nozzles, for example electromagnets (50), like Laval nozzles, convert the thermal energy of the propellant to the directed kinetic energy. The advantage of magnetic nozzles is that the contact of the plasma with the magnetic nozzle surface is minimized, preventing the thruster structural elements from sputtering and ablation, and as the result thruster characteristics degradation and the thruster failure, while magnetic nozzles provide the possibility of using additional mechanisms for the formation of thrust due to the interaction of plasma and magnetic fields created by a magnetic nozzles.

The mechanisms by which thermal energy is extracted from the plasma using electromagnets of the accelerating magnetic systems (7, 50) include the law of conservation of the adiabatic invariant of the magnetic moment, the electric field forces, the direction of thermal energy, and Joule heating. The mechanisms of plasma separation include resistive diffusion of the magnetic field, recombination processes in the plasma, magnetic reconnection of magnetic field lines, loss of adiabaticity of the plasma expansion process, the effects of inertial forces and the effects of stratification of the lines of self-induced electromagnetic fields. The process of pulse transmission from the plasma to the spacecraft is a consequence of the interaction between the lines of the applied magnetic field created by the electromagnet of the accelerating magnetic system (7) and the induced flows that are formed due to the magnetic pressure.

Three key steps are required to generate thrust in the magnetic nozzle: 1. convert magnetoplasma energy into a directed kinetic energy; 2. Effective separation of the plasma from the magnetic field lines; 3. Transmission of the angular momentum from the plasma to the spacecraft.

The main mechanisms of energy conversion in the magnetic nozzle and the corresponding types of acceleration between which the energy is transferred include: 1. Preservation of the adiabatic invariant of the magnetic moment (acceleration in an electromagnetic field); 2. Acceleration in an electric field; 3. The direction of motion of thermally heated particles (gas-dynamic acceleration); 4. Joule heating (thermal acceleration).

In examples, an accelerating magnetic system 7, 50 can accelerate exhausted from the guide tube plasma flow by the electrostatic acceleration mechanism, i.e. the formation of a double electrostatic layer in the plasma flow at the outlet of the magnetic nozzle. The plasma flow can be accelerated up to 11 $km*s^{-1}$ at relatively low powers (120 W) and low external magnetic field (200 G) [3]. The specific impulse created by the magnetic nozzle in the experiment is sufficient for effective operations in space.

Thrusters described herein can create thrust vectors, located in different projections. The axes can be collinear with the axis of the guide tubes (e.g., guide tubes 2, 20) to create the total thrust vector that performs control actions on SC. The total thrust vectors can be used, for example, for transferring it from parking orbit to the target orbit, orbit maintenance, attitude control, altitude control, unloading attitude control, systems, maneuvers between orbits, de-orbiting.

The thrusters can create multiple thrust vectors by using only one thrust. Known propulsion technologies allow only one thrust vector, multiple thrust vectoring propulsion systems with insufficient thrust or may slightly change it by using gimbals. Known propulsion systems creating thrust only in one direction significantly limits applications of propulsion systems onboard small satellites or drastically reduce the mass of payload and the cost of operations for Geostationary Orbit (GSO) satellites. The former case is that modern one directional propulsion systems cannot be used more than one onboard small satellites that means maneuverability of these satellites cannot be increased—actually in some cases even one propulsion system is an unaffordable luxury. Known propulsion systems may also take up to 80% of volume and mass for the case of GSO satellites because these satellites are equipped with up to 10 thrusters. The reason of one direction of generated thrust vector for modern propulsion systems is that they use only one direction of their working medium source—for plasma thrusters it is plasma source, for chemical propulsion it is combustion chamber, and for thermal thrusters it is heating reactor.

Turning now to the figures, FIG. 1 illustrates a wave plasma thruster with a closed-ring-shaped gas discharge chamber. The plasma thruster can include a plasma source that is a gas discharge chamber 1 closed-ring-shaped but to this source multiple guide tubes 2 can be attached and the guide tubes 2 determine multiple directions of thrust vectors. The ability to generate multiple thrust vectors leads to capability of one thruster to create mechanical impacts in space on satellites in any directions that means by using only one thruster it is possible to control attitude, altitude, perform maneuvers between orbits, or perform interplanetary missions.

The proposed thruster can consist of several identical guide tubes 2 or can include several identical guide tubes 2 and one or more guide tubes 2 with big diameter and more powerful magnetic nozzle 7. The former case can be applied for attitude control of satellites and maneuvers between Low Earth Orbits (LEO)—up to 2000 km—or maneuvers from LEO to GSO that means that space tugs can be eliminated. In the last case, identical gas tubes 2 can operate for attitude control, and the bigger guide tube will operate for operations that requires very dense plasma flows that are accelerated by magnetic nozzles for high intense propulsion operations, for example, for interplanetary flights.

In the case of the configuration of the antenna 3 surrounded with the dielectric sleeve with metallized outer surface 4, which is suggested to be used in this invention, there will not be impacts of the electromagnetic fields created by the antenna 3 on surrounded parts of the thruster and satellite as well as there will not be occurrence of the capacitively coupled discharges on the surface of the antenna 3 and surrounded surfaces, hence there will not be plasma sputtering, and as the result the service life of the thruster will be extended.

The fact that electromagnetic waves created by the antenna 3 and trapping magnetic system 6 are trapped in the gas discharge chamber 1 and circulate inside it continuously leads to the significant increase of efficiency of the wave plasma thruster. It is due to the physics fact that electromagnetic waves created by the electromagnetic fields in plasma in constant magnetic field—in the invention created by the antenna 3—electromagnetic fields—and the trapping magnetic system 6—constant magnetic field—transfer its energy into plasma discharge on the length of several times antenna length. In straight gas discharge chambers this physics fact leads to the losses of the electromagnetic power because the induced electromagnetic waves leave the gas discharge chamber with straight shape too early to transfer its energy—usually the length of the straight-shaped gas discharge chambers is about two-five times of the antenna length.

In the proposed invention induced electromagnetic waves are trapped inside the gas discharge chamber 1 having closed-ring-shaped, and as the result all power that is carried by the induced electromagnetic waves are transferred into plasma. Thus, for operations of the suggested thruster the power requirements for producing the same with the state of the art level of thrust can be decreased that is important in the case of small satellites or with the same level of power the integral characteristics of the thruster such as specific impulse and thrust can be significantly increased.

The plasma thruster can include a gas-discharge chamber 1 having the form of a closed ring tube, having sealed gas-dynamic connections with guide tubes 2, having sealed gas-dynamic connection with propellant storage system 10. Inside the gas discharge chamber 1 the propellant injected into it from the propellant storage system 10 is ionized by the electromagnetic fields created by the antenna 3. The closed-ring-shaped form of the gas discharge chamber 1 allows the waves created in the plasma by the interaction of the electromagnetic fields created by the antenna 3 and constant magnetic field created by the trapping magnetic system 6 infinitely propagate.

At least one guide tube 2 can be connected to the gas discharge chamber 1 at one end, and open to the outside space at the other end. At least one electromagnet of the accelerating magnetic system 7 is located at the end of the guide tube 2 that is open to the outside space. Within the guide tube 2 a constant magnetic field coaxial with the axis of the respective guide tube 2 or having a slight inclination from it can be created by the electromagnet of the accelerating magnetic system 7 under the influence of which is either the acceleration or the locking mechanism is applied to the plasma flow generated in the gas discharge chamber 1, while the cases of acceleration or locking of the plasma flow within the guide tube 2 under the influence of a magnetic field generated by the electromagnet of the accelerating magnetic system 7 depends on the direction of the magnetic field lines generated by the electromagnets of the accelerating magnetic system 7, whereas in the case of acceleration of the plasma flow the magnetic field lines directed towards the end of the guide tube 2, opened to the outside space, and in the case of locking the plasma flow, the magnetic field lines directed from the end of the guide tube 2, opened to the outside space, towards the gas discharge chamber 1. Thus, the guide tube 2 serves as a guide of the plasma flow generated in the gas-discharge chamber 1, while the acceleration of the plasma flow occurs in the case of the magnetic field lines, created by the electromagnet of the accelerating magnetic system 7 of the respective guide tube 2, towards the end of the guide tube 2, opened to the outside space, or the guide tube 2 serves as the region in which the plasma flow, which could potentially get out of the gas discharge chamber 1 will be locked by the magnetic field, created by the electromagnet of the accelerating magnetic system 7 of the respective guide tube 2, in the case the magnetic field lines is directed toward the gas discharge chamber 1. In the case of acceleration of the plasma flow and exhausting it from the end of the guide tube 2, opened to outside space, the thrust will be generated from the corresponding guide tube 2.

At least one antenna 3 can be located on the outside of the gas discharge chamber 1 and can include an electrical communication line with a radiofrequency generator (RF-generator) 5. The antenna 3 can be supplied with RF current from the RF-generator 5 and create electromagnetic fields inside the gas discharge chamber 1 that can ionize the propellant injected into the gas discharge chamber 1 from the propellant storage system 10. Additionally, or alternatively, the interactions of the electromagnetic fields created by the antenna 3 and constant magnetic field created by the trapping magnetic system 6 can lead to the occurrence of electromagnetic waves inside the plasma bulk inside the gas discharge chamber 1.

At least one dielectric sleeve with metallized outer surface 4 can be included. The number of dielectric sleeves with metallized outer surface 4 can depend on the number of antennae 3. For example, each of the antennae 3 can include a dielectric sleeve with metallized outer surface 4 that can cover the external surface of the antenna 3. The dielectric sleeve with metallized outer surface 4 prevents the electromagnetic fields created by the antenna 3 to impact on the surrounded surfaces as well as prevents the occurrence of the capacitively coupled discharges on the surface of the antenna 3 and the surrounded surfaces.

The RF-generator 5 can include electrical communication lines with at least one antenna 3, a power converter 11 and a control module 12. The RF-generator 5 supplies the antenna 3 with RF current.

at least one trapping magnetic system 6 that surrounds the gas discharge chamber 1 having an electrical communication line with power supply for trapping magnetic systems 8. The trapping magnetic system 6 creates the longitudinal constant magnetic field inside the gas discharge chamber 1 that has magnetic field lines that are closed inside the gas discharge chamber 1. The longitudinal constant magnetic field created by the trapping magnetic system 6 inside the gas discharge chamber 1 together with the electromagnetic fields created by the antenna 3 cause the occurrence of electromagnetic waves in the plasma bulk inside the gas discharge chamber 1. These waves are motion of electrons that are affected by the constant magnetic field created by the trapping magnetic system 6. These waves are trapped inside the gas discharge chamber 1 by the longitudinal constant magnetic field created by the trapping magnetic system 6 that means the waves that are created in plasma bulk by the interactions of the electromagnetic fields created by the antenna 3 and the constant magnetic field created by the trapping magnetic system 6 propagate continuously on close paths inside the gas discharge chamber 1.

At least one accelerating magnetic system 7 can be included. In various embodiments, multiple magnetic systems 7 can be included (e.g., can depend on the number of guide tubes 2). The accelerating magnetic system 7 can include, having an electrical connection line with the power supply for accelerating magnetic systems 9, located at the end of the corresponding guide tube 2 that is open to the atmosphere.

At least one power supply 8 can be included. The power supply 8 can include an electrical communication line connected with one or more of the trapping magnetic system 6, the power converter 11, and/or the control module 12. The power supply 8 can supply electric current to the trapping magnetic system 6.

In various embodiments, a second power supply 9 can be included. The second power supply 9 can include electrical communication lines connected with one or more of the accelerating magnetic system 7, the power converter 11, and/or the control module 12. The second power supply 9 can supply electric current to the accelerating magnetic system 7.

A propellant storage system 10 can include a gas-dynamic connection with the gas discharge chamber 1. The propellant storage system 10 can be connected to the gas discharge chamber 1 through the radial feedthrough and can include electrical communication lines with power converter 11 and the control module 12. The propellant storage system 10 serve as storage, preparation, and injection of the propellant into the gas discharge chamber 1 for subsequent ionization and acceleration, and as a result, creating thrust.

The power converter 11 can include electrical communication lines with the onboard power sources of the spacecraft, the RF-generator 5, the power supply for trapping magnetic systems 8, the power supply for accelerating magnetic systems 9, the propellant storage system 10, and/or the control module 12. The power converter 11 serves for the transformation of characteristics of the electric power that is available onboard the spacecraft to characteristics that are suitable for the power supply of the RF-generator 5, the power supply for trapping magnetic systems 8, the power supply for accelerating magnetic systems 9, the propellant storage system 10, and/or the control module 12.

The control module 12 can include electrical communication lines with the RF-generator 5, the power supply for trapping magnetic systems 8, the power supply for accelerating magnetic systems 9, the propellant storage system 10, and/or the power converter 11. The control module 12 can collect information on the characteristics of high frequency plasma thruster and can transmit this information to the control system of the spacecraft for its further transfer to the command post.

Figure 2:
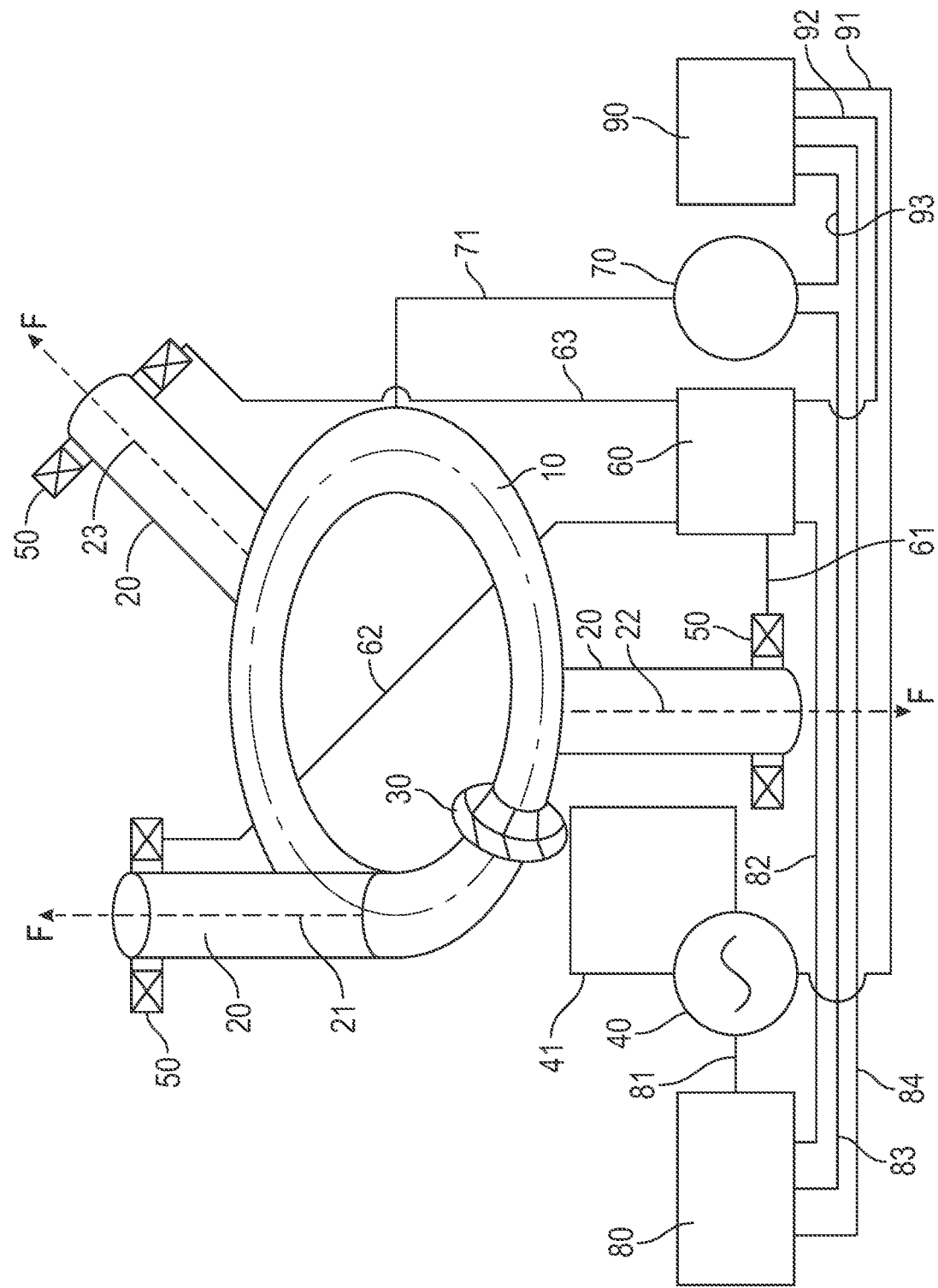
FIG. 2 illustrates a high frequency plasma thruster with a closed-ring-shaped gas discharge chamber, according to various embodiments.

Turning to FIG. 2, a high frequency plasma thruster with closed-ring-shaped gas discharge chamber is shown. The high frequency plasma thruster with closed-ring-shaped gas discharge chamber can include one plasma source that is a gas discharge chamber 10 closed-ring-shaped but to this source multiple guide tubes 20 can be attached and the guide tubes 20 determine multiple directions of thrust vectors. The ability to generate multiple thrust vectors leads to capability of one thruster to create mechanical impacts in space on satellites in any directions that means by using only one thruster it is possible to control attitude, altitude, perform maneuvers between orbits, or perform interplanetary missions.

The proposed thruster can consist of several identical guide tubes 20 or can include several identical guide tubes 20 and one or more guide tubes 20 with big diameter and more powerful magnetic nozzle. The former case can be applied for attitude control of satellites and maneuvers between Low Earth Orbits (LEO)—up to 2000 km—or maneuvers from LEO to GSO that means that space tugs can be eliminated. In the last case, identical gas tubes 20 can operate for attitude control, and the bigger guide tube will operate for operations that requires very dense plasma flows that are accelerated by magnetic nozzles for high intense propulsion operations, for example for interplanetary flights—to Mars, Jupiter, outer space.

In the case of the configuration of the antenna with a magnetic core 30, which is suggested to be used in this invention, there is a sharp decrease in the losses of the alternating magnetic field created when by the high frequency electric current applied to the conducting material 32 due to the fact that the magnetic core 31 has a high magnetic permeability. In turn, reducing the losses of alternating magnetic fields leads to a decrease in the loss of the alternating electric field generated by the magnetic core 31, and an increase in the efficiency of power transfer from the high frequency generator 40 to the plasma in the inner cavity of the gas discharge chamber 10 is achieved.

Since the alternating magnetic field generated by the conductive material 32 is effectively absorbed by the magnetic core 31, there is no effect of the electromagnetic fields generated by the antenna with a magnetic core 30 on the structural elements of the thruster and spacecraft systems. Also due to the efficient absorption of the alternating magnetic field by the magnetic core 31 occurrence of the capacitively coupled discharges around the antenna with a magnetic core 30 is eliminated, because the magnetic core 31 perceives almost all alternating magnetic field generated by the conductive material 31, producing an alternating electric field inside the gas discharge chamber 10.

For the effective operation of the antenna with a magnetic core 30 the frequency of the high frequency current applied to the antenna with a magnetic core 30 by the HF-generator 40 have to be in the range of 10 . . . 500 kHz. At frequencies below 10 kHz, the electric field intensity generated by the magnetic core 31 of the antenna with magnetic core 30 will not be sufficient for ionization of the propellant inside the gas discharge chamber 10, and at frequencies more than 500 kHz alternating magnetic field perceived by the magnetic core 31 will cause it to heat, such as in the induction heating device.

The high frequency plasma thruster with closed-ring-shaped gas discharge chamber can include a gas discharge chamber 10. In various embodiments, the gas discharge chamber 10 can be closed-ring-shaped. The gas discharge chamber 10 can include an inner cavity, for example, made of a dielectric material. The gas discharge chamber 10 can be permeably connected to at least one guide tube 20. At least one antenna with magnetic core 30 can be located on the outside of the guide tube 20. The gas discharge chamber 10 can include a line of gas-dynamic connection with the propellant storage system 70. The gas discharge chamber 10 can be connected through the radial feedthrough 71. Propellant can be injected in the gas chamber 10, for example, through the radial feedthrough 71. While inside the gas discharge chamber 10, the ionization of the propellant injected through the radial feedthrough 71 in the gas-discharge chamber 10 from the propellant storage system 70 is occurred under the action of an alternating electromagnetic field created in the inner cavity of the gas discharge chamber 10 by at least one antenna with a magnetic core 30.

At least one guide tube 20 can be connected (e.g., impermeably connected) to the gas discharge chamber 10 at one end, and open to the outside space at the other end. At least one electromagnet of the magnetic system 50 can be located at the end of the guide tube 20 that is open to the outside space. Within the guide tube 20 a constant magnetic field coaxial with the axis of the respective guide tube 21, 22, 23 is created by electromagnet of the magnetic system 50. Under the acceleration or the locking mechanism can be applied to the plasma flow generated in the gas-discharge chamber 10. The acceleration or locking of the plasma flow within the guide tube 20 can be under the influence of a magnetic field generated by the electromagnet of the magnetic system 50. The plasma flow can depend on the direction of the magnetic field lines generated by the electromagnets of the magnetic system 50. For example, in the case of acceleration of the plasma flow the magnetic field lines directed towards the end of the guide tube 20, opened to the outside space, and in the case of locking the plasma flow, the magnetic field lines directed from the end of the guide tube 20, opened to the outside space, towards the gas discharge chamber 10. The guide tube 20 can serve as a guide of the plasma flow generated in the gas-discharge chamber 10, while the acceleration of the plasma flow occurs in the case of the magnetic field lines, created by the electromagnet of the magnetic system 50 of the respective guide tube 20, towards the end of the guide tube 20, opened to the outside space, or the guide tube 20 serves as the region in which the plasma flow, which could potentially get out of the gas discharge chamber 10 will lock by the magnetic field, created by the electromagnet of the magnetic system 50 of the respective guide tube 20, in the case the magnetic field lines is directed toward the gas discharge chamber 1. In the case of acceleration of the plasma flow and exhausting it from the end of the guide tube 20, opened to outside space, the thrust will be generated from the corresponding guide tube 20.

Figure 3:
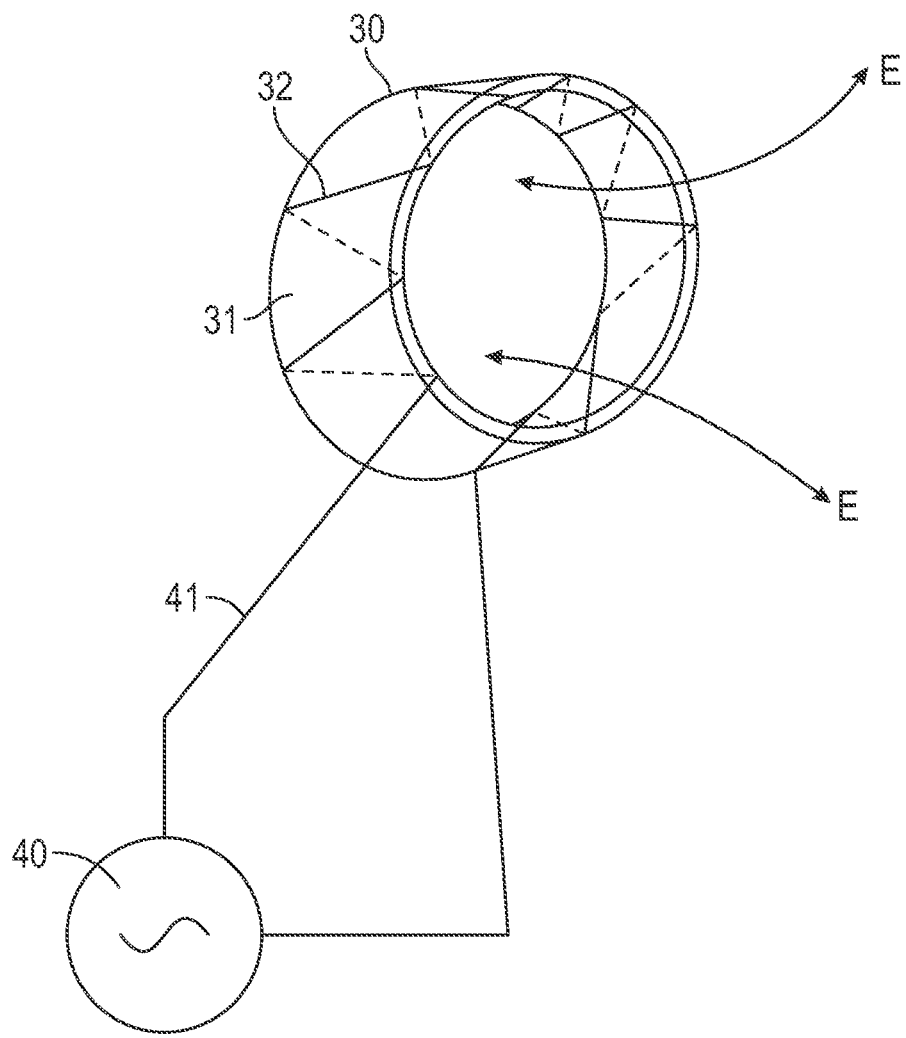
FIG. 3 is the representation of the high frequency antenna of high frequency plasma thruster with closed-ring-shaped gas discharge chamber of FIG. 2, according to various embodiments.

At least one antenna with a magnetic core 30 having an electrical communication line with a high frequency generator 40 (HF-generator) can be located on the outside of the gas discharge chamber 10. The antenna with a magnetic core 30 consists of a magnetic core 31 of a closed ring shape with a hole in the center that is not less than the external dimensions of the gas discharge chamber 10, around which a conductive material 32 (cable, ribbon conductor, etc.) is wound (see FIG. 3), which does not have electrical contact with the magnetic core 31, while it has an electrical connection line 41 with the HF-generator 40. Conductive material 32 when high frequency current is applied to it (Hz 10000-500000 Hz) creates an alternating magnetic field, perceived by the magnetic core 31, while the flow of the alternating magnetic field inside the magnetic core 31 creates the alternating electric field in the inner cavity of the gas discharge chamber 10 where the ionization of the propellant coming into the gas discharge chamber 10 from the propellant storage system 70 through the radial feedthrough 71 is occurred due to this alternating electric field—the oscillations of electrons due to this alternating electric field in which electrons gain energy enough to ionize propellant atoms or molecules.

An HF-generator (40) can include electrical communication lines 41, 81, 91 connected with at least one antenna with a magnetic core 30, a power converter 80, and/or a control module 90. The HF-generator 40 generates a high frequency current (10000 Hz-500,000 Hz), which is applied via an electrical communication line 41 to at least one antenna with a magnetic core 30, particularly HF-generator has an electrical communication line 41 with the conductive material 32 of the antenna with a magnetic core 30, while an alternating magnetic field is generated when a high frequency current is applied to the conductive material 32 of the antenna with a magnetic core 30, which is then perceived by the magnetic core 31 of the antenna with a magnetic core 30, which then generates an alternating electric field in the inner cavity of the gas discharge chamber 10, under the action of which, in the inner cavity of the gas-discharge chamber 10, the propellant injected into the gas-discharge chamber 10 from the propellant storage system 70 is ionized.

The power thruster can include at least one magnetic system 50, however, the number of magnetic systems 50 can depend on the number of guide tubes 20. The magnetic system 50 can include at least one electromagnet 51, 52, 53 located at the end of the corresponding guide tube 20, opened to the outside space. The magnetic system 50 can include an electrical connection line 61, 62, 63 connected with the power source of the magnetic systems 60. The electromagnet 51, 52, 53 of the magnetic system 50 can generate coaxial with the respective guide tube 20 magnetic field. If the direction of the magnetic field lines are directed toward the end of the guide tube 20, opened to the outside space, where an acceleration of the plasma flow generated in the gas discharge chamber 10 is occurred and, as a consequence, the creation of thrust from the respective guide tube 20, and in the case of the direction of the magnetic field lines directed to the gas discharge chamber 10, the locking mechanism of the plasma flow generated by a discharge chamber 10 is occurred.

At least one power source for magnetic systems 60 can be included. The power source for magnetic systems 60 can include electrical communication lines 61 . . . 63, 82, 92 connected with at least one magnetic system 50, with the power converter 80, and/or with the control module 90. The power supply of the magnetic systems 60 can supply at least one magnetic system 50 with electric current, and can also set the direction of the electric current inside at least one electromagnet of the magnetic system 50. The electric current in the electromagnetic of the magnetic system 50 can determine the direction of the magnetic field lines generated by the electromagnet of the magnetic system 50 which can determine the acceleration or locking modes in the guide tube 20 of the plasma flow generated inside the gas discharge chamber 10;

The propellant storage system 70 can include a line of gas-dynamic connection 71 connected with the gas discharge chamber 10. The propellant storage system 70 can be connected to the gas discharge chamber 10 through the radial feedthrough 71. The electrical communication lines 83, 93 can be connected with the power converter 80 and/or the control module 90. The propellant storage system 70 serves for storage, preparation and injection of the propellant into the gas discharge chamber 10 for subsequent ionization and acceleration, and as a result, creating thrust.

The power converter 80 can include electrical communication lines 85, 81, 82, 83, 84 with the onboard power sources of the spacecraft, the HF-generator (40), the power source for magnetic systems 60, the propellant storage system 70, and/or the control module 90. The power converter 80 serves for the transformation of characteristics of the electric power that is available onboard the spacecraft to characteristics that are suitable for power supply of the HF-generator 40, the power source for magnetic systems 60, the propellant storage system 70, and/or the control module 90.

The control module 90 can include electrical communication lines 91, 92, 93, 84 correspondingly with the HF-generator 40, the power source for magnetic systems 60, the propellant storage system 70, the power converter 80, setting control signals on the HF-generator 40, the power source for magnetic systems 60, the propellant storage system 70, and/or the power converter 80. The control module 90 can collect information on the characteristics of high frequency plasma thruster, transmitting this information to the control system of the spacecraft for its further transfer to the command post.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A satellite comprising:
    a frame defining an interior area and a satellite power source positioned in the interior area; and
    an electrodeless plasma thruster with a closed-ring-shaped gas discharge chamber at least partially positioned within the interior area, the electrodeless plasma thruster comprising:
        the closed-ring-shaped gas discharge chamber;
        a guide tube having a first end coupled with the closed-ring-shaped gas discharge chamber and a second open end;
        an antenna positioned on an exterior of the closed-ring-shaped gas discharge chamber;
        a dielectric sleeve with a metallized outer surface positioned on an external surface of the antenna, the dielectric sleeve at least partially surrounding the antenna;
        a magnetic system positioned at the second open end of the guide tube;
        a propellant storage system in fluid communication with the closed-ring-shaped gas discharge chamber;
        a power supply electrically coupled with the magnetic system;
        a power converter electrically coupled with the power supply and the propellant storage system; and
        a control module electrically coupled with and for controlling the power converter, the propellant storage system, and the power supply, the control module configured to receive data associated with one or more characteristics of the electrodeless plasma thruster.

2. The satellite of claim 1, further comprising a control system and wherein the control module is further configured to transmit the data to the control system.

3. The satellite of claim 2, wherein the control system is configured to transmit the data to a command post.

4. The satellite of claim 1, wherein the antenna comprises a magnetic core.

5. The satellite of claim 1, wherein the electrodeless plasma thruster with closed-ring-shaped gas discharge chamber further comprises a high frequency generator electrically coupled with the antenna, the power converter, and the control module.

6. The satellite of claim 1, wherein the electrodeless plasma thruster with closed-ring-shaped gas discharge chamber further comprises a radiofrequency generator electrically coupled with the antenna, the power converter, and the control module.

7. The satellite of claim 1, wherein the magnetic system is a first magnetic system and the electrodeless plasma thruster with closed-ring-shaped gas discharge chamber further comprises a second magnetic system that at least partially surrounds the closed-ring-shaped gas discharge chamber.

8. The satellite of claim 7, wherein the first magnetic system is an accelerating magnetic system and the second magnetic system is a trapping magnetic system.

9. The satellite of claim 1, wherein the power supply is a first power supply and the electrodeless plasma thruster with closed-ring-shaped gas discharge chamber further comprises a second power supply.

10. The satellite of claim 1, wherein the power converter is electrically coupled with the satellite power source.

11. The satellite of claim 1, wherein the antenna comprises a plurality of antennas positioned on an exterior of the closed-ring-shaped gas discharge chamber.

12. The satellite of claim 11, wherein each antenna of the plurality of antennas comprises a dielectric sleeve with a metallized outer surface positioned on an external surface of each antenna of the plurality of antennas.

13. The satellite of claim 1, wherein the electrodeless plasma thruster with the closed-ring-shaped gas discharge chamber further comprises a plurality of guide tubes, each guide tube of the plurality of guide tubes having a first end coupled with the closed-ring-shaped gas discharge chamber and each guide tube of the plurality of guide tubes having a second open end.

14. The satellite of claim 13, wherein the electrodeless plasma thruster with the closed-ring-shaped gas discharge chamber further comprises a plurality of magnetic systems, wherein each of the magnetic systems is positioned at the second end of a respective guide tube.

15. A high frequency plasma thruster with a closed-ring-shaped gas discharge chamber, the high frequency plasma thruster comprising:
    the closed-ring-shaped gas discharge chamber;
    a guide tube having a first end coupled with the closed-ring-shaped gas discharge chamber and a second open end;
    an antenna comprising a magnetic core, the antenna positioned on an exterior of the closed-ring-shaped gas discharge chamber;

a dielectric sleeve positioned on an external surface of the antenna, the dielectric sleeve at least partially surrounding the antenna;

a magnetic system located at the second open end of the guide tube;

a propellant storage system in fluid communication with the closed-ring-shaped gas discharge chamber;

a high frequency generator electrically coupled with the antenna;

a power supply electrically coupled with the magnetic system;

a power converter electrically coupled with the power supply, the high frequency generator, and the propellant storage system; and a control module electrically coupled with and for controlling the power converter, the high frequency generator, the propellant storage system, and the power supply.

16. A wave plasma thruster with a closed-ring-shaped gas discharge chamber, the wave plasma thruster comprising:

the closed-ring-shaped gas discharge chamber;

a guide tube having a first end coupled with the closed-ring-shaped gas discharge chamber and a second open end;

an antenna positioned on an exterior of the closed-ring-shaped gas discharge chamber;

a dielectric sleeve positioned on an external surface of the antenna, the dielectric sleeve at least partially surrounding the antenna;

a first magnetic system at least partially surrounding the closed-ring-shaped gas discharge chamber;

a second magnetic system positioned at the second open end of the guide tube;

a propellant storage system in fluid communication with the closed-ring-shaped gas discharge chamber;

a radio frequency generator electrically coupled with the antenna;

a first power supply electrically coupled with the first magnetic system;

a second power supply electrically coupled with the second magnetic system;

a power converter electrically coupled with the radio frequency generator, the first power supply, the second power supply, and the propellant storage system; and a control module electrically coupled with and for controlling the power converter, the propellant storage system, the radio frequency generator, the first power supply, and the second power supply.

* * * * *